Nov. 15, 1949     A. O. ROBERTS     2,488,478
DUAL FLUID COUPLING POWER TRANSMISSION
Filed Sept. 20, 1946     2 Sheets-Sheet 1

A. O. ROBERTS.
INVENTOR.
BY
ATTORNEYS.

Nov. 15, 1949     A. O. ROBERTS     2,488,478
DUAL FLUID COUPLING POWER TRANSMISSION
Filed Sept. 20, 1946     2 Sheets-Sheet 2

A. O. ROBERTS.
INVENTOR.

BY
ATTORNEYS.

Patented Nov. 15, 1949

2,488,478

UNITED STATES PATENT OFFICE 2,488,478

DUAL FLUID COUPLING POWER TRANSMISSION

Albert O. Roberts, Dearborn, Mich., assignor to Ford Motor Company, Dearborn, Mich., a corporation of Delaware Application September 20, 1946, Serial No. 698,122

1 Claim. (Cl. 60—54)

This invention relates generally to power transmissions and has particular reference to power transmissions in which a pair of fluid couplings are utilized.

An object of the present invention is to provide a power transmission utilizing a pair of fluid couplings in which one of the fluid couplings is connected to the driven shaft of the transmission at one torque ratio and the other fluid coupling is connected to the driven shaft at another torque ratio through suitable reduction gearing. Two separate power paths are thus provided from the drive shaft to the driven shaft, enabling the engine torque to be divided and the divided portions thereof transmitted to the driven shaft at different torque ratios. Preferably one fluid coupling is directly connected to the driven shaft while the other fluid coupling is connected through suitable reduction gearing. With this arrangement, torque multiplication is obtained in only one path. As the speed increases, the torque division between the two paths is varied until finally all of the engine torque is transmitted through the coupling connected directly to the driven shaft, power then being transmitted at a 1 to 1 ratio.

Another object of the invention is to provide a power transmission including a pair of fluid couplings providing separate power paths from the drive member to the driven member at different torque ratios, in which means are provided for varying the fluid content of one of the couplings. The fluid coupling which is directly connected to the driven shaft is emptied at idling speed so that when starting the entire engine torque is transmitted through the other fluid coupling and the gear reduction to provide a maximum torque multiplication. Fluid is admitted through a centrifugally operated valve when a predetermined speed has been attained, and as the coupling is filled an increasing portion of the engine torque is transmitted therethrough until finally this coupling transmits the entire engine torque at a 1 to 1 ratio. The other coupling and its reduction gearing then overrun through an overrunning clutch.

Still another object of the invention is to provide a transmission of the type mentioned above which is provided with a fluid pump for supplying fluid to the fluid coupling and in which a pressure relief valve is incorporated together with means for modulating the action of the pressure relief valve in accordance with engine manifold vacuum. Since manifold vacuum is proportional to the load, a torque responsive control is thus provided.

Other objects and advantages of the invention will be made more apparent as this description proceeds, particularly when considered in connection with the accompanying drawings, in which.

Figure 1:
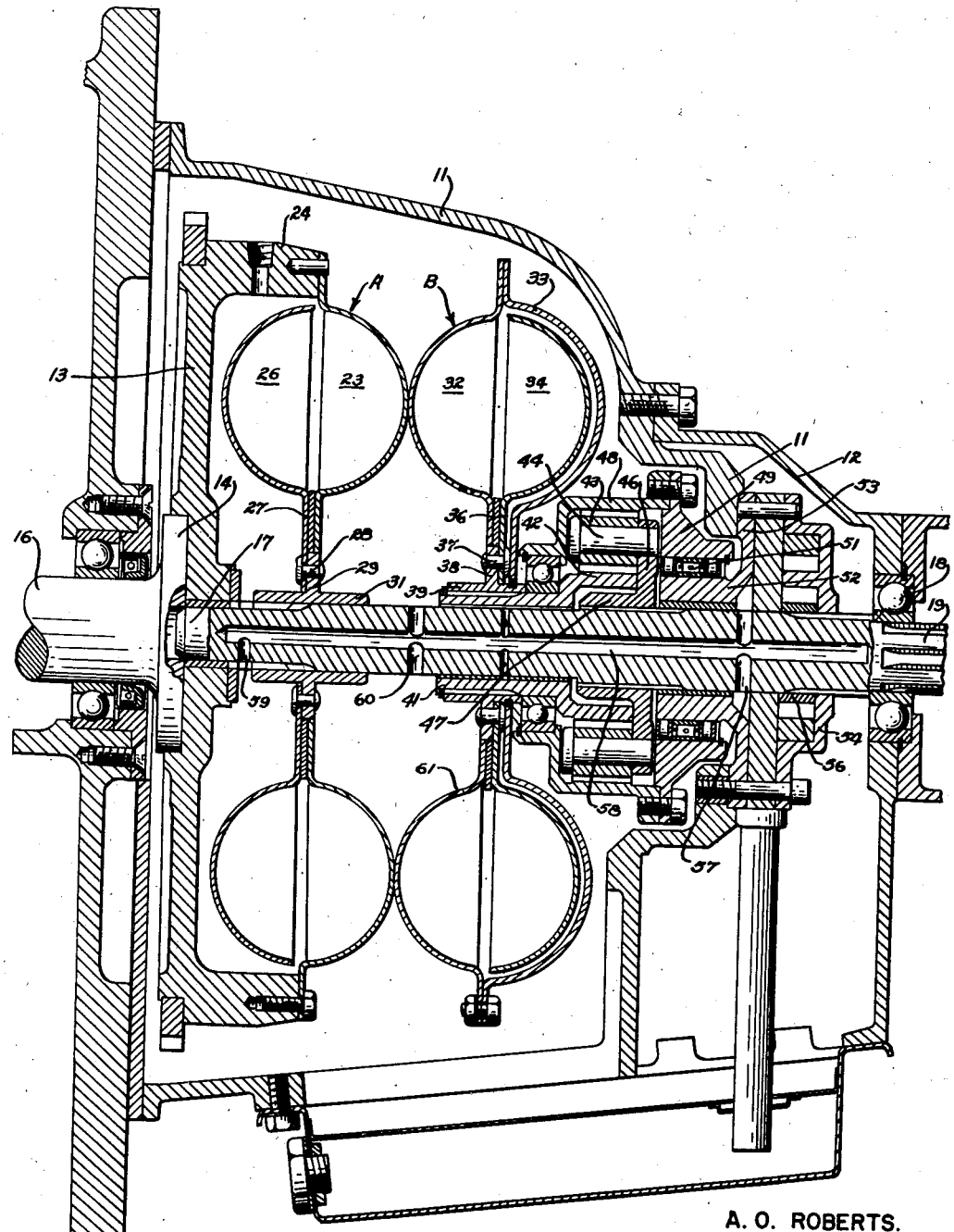
Figure 1 is a longitudinal cross sectional view through a transmission embodying the present invention.

Referring now more particularly to the drawings, the power transmission shown in Figure 1 is contained within a housing comprising housing sections 11 and 12. A flywheel 13 is rotatably mounted within the housing and is connected to the flange 14 of the crankshaft 16 of an internal combustion engine (not shown). The reference character 17 indicates a driven or output shaft, the forward end of which is journaled in the hub of the flyweel 13. The rearward end of the driven shaft 17 is journaled in bearings 18 carried in the housing section 12, and is splined at 19 for connection to the propeller shaft of the vehicle.

The transmission includes a pair of adjacent fluid couplings A and B. The impeller 23 of fluid coupling A is bolted to the rim 24 of the flywheel for rotation therewith as a unit. The runner 26 of coupling A has an integral web 27 which is connected by rivets 28 to the flange 29 of a sleeve 31 which is splined to the driven shaft 17.

The impeller 32 of fluid coupling B is identical in construction with the impeller 23 of fluid coupling A but is mounted in the opposite direction. The back walls of the impellers 23 and 32 are welded together so that both rotate together. If desired, the two impellers may be formed of one piece, but it is more economical to form separate impellers of sheet metal stampings and then to weld the two together. An annular cover 33 is bolted to the impeller 32 to form a closed fluid chamber within which there is mounted for relative rotation a runner 34. The runner 34 has a web 36 connected by rivets 37 to the flange 38 of a sleeve 39 splined to the hub 41 of a sun gear 42. The hub 41 is journaled on the driven shaft 17.

Meshing with the sun gear 42 are a plurality of planet pinions 43 journaled upon shafts 44 carried by the planet carrier 46. The planet carrier 46 has a hub 47 splined to the driven shaft 17. Encircling the planet pinions 43 and meshing therewith is a ring gear 48 to which is bolted a ring 49 having an internal bearing surface engageable with the overrunning clutch 51. The overrunning clutch thus connects the ring gear 48 with tht hub 52 of a reaction member 53 which is bolted to the housing section 11.

From the foregoing it will be seen that the runner 26 of fluid coupling A is directly connected to the driven shaft 17 while the runner 34 of fluid coupling B is connected to the driven shaft through a planetary gearset and an overrunning clutch. The planetary gearset provides a reduction, which may be approximately 3 to 1 for automotive use, and the overrunning clutch permits the transmission of power through the planetary gearset in one direction but overruns in the opposite direction of rotation. Thus the planetary gearset provides a torque multiplication, the reaction for which is taken through the overrunning clutch 51 and the reaction member 53 to the housing section 11.

A pump housing 54 is mounted upon the rearward end of the housing section 11 and contains a gear pump 56 which is driven by the driven shaft 17 and which supplies fluid under pressure through passages 57 to the central bore 58 of the driven shaft. In addition to supplying lubricating oil to the various bearing surfaces, the pump functions to maintain fluid couplings A and B completely filled with fluid, communication to the coupling A being through the radial passage 59 in the shaft 17, and communication to the coupling B being through the radial passage 60 in the shaft 17 and the ports 61 in the impeller 32.

In operation, it will be seen that the two fluid couplings provide separate power paths at different torque ratios. The path through fluid coupling A can only transmit power at a one to one ratio since the runner 26 is directly connected to the driven shaft, but the path through fluid coupling B and the planetary gearset provides a torque multiplication. When starting, the engine torque is divided between the two fluid couplings with the result that a torque multiplication is obtained between the drive and driven shafts of the transmission, this resultant torque multiplication being less than the gear ratio of the planetary gearset since a portion of the torque is transmitted through coupling A at a 1 to 1 ratio. Fluid slippage in the couplings A and B compensates for the necessary relative movement between the two power paths.

At higher speeds, a greater portion of the engine torque is transmitted through the path including fluid coupling A, with the result that the overall torque multiplication through the transmission decreases until such time as the driven shaft 17 and the planet carrier 46 overrun the overrunning clutch 51. When this occurs, no power is transmitted through the path including fluid coupling B, the entire engine torque being transmitted through fluid coupling A at direct drive or 1 to 1 ratio.

Figure 2:
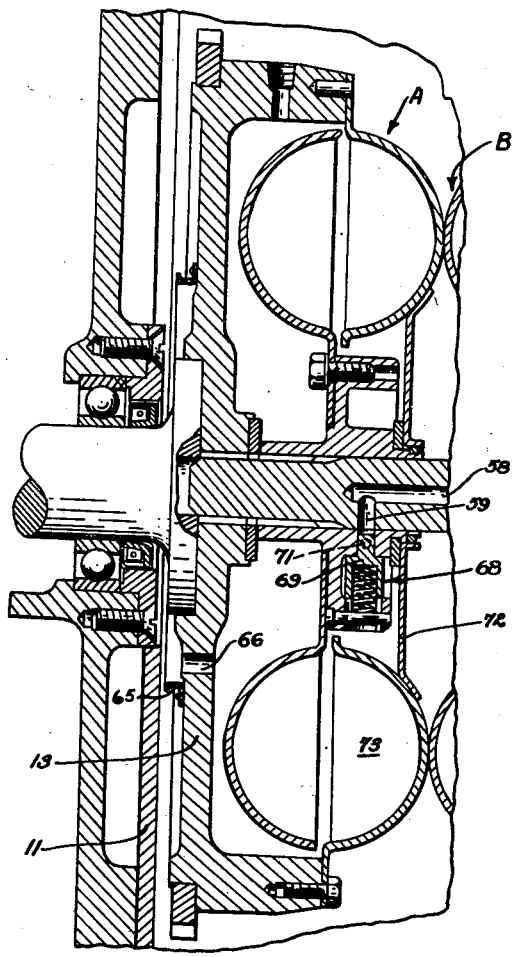
Figure 2 is a fragmentary longitudinal cross sectional view through a transmission forming a modification of the invention.

Reference is now made to Figure 2 which shows a modification of the construction shown in Figure 1. The general construction of the transmission is the same, except that means are provided for draining the fluid from coupling A during idling and for refilling the coupling when a certain rotational speed has been attained. To accomplish this a series of drain holes 66 are formed in the flywheel 13 adjacent the radially inner portion of the torus formed by the fluid coupling. During rotation the fluid in the coupling is thrown radially outwardly by centrifugal force and the coupling remains substantially filled. When the speed drops to idling, however, the centrifugal force is no longer sufficient to keep the fluid in the torus, and it drains through the holes 66 into the housing section 11 and then to the sump (not shown). An annular baffle 65 is mounted upon the flywheel 13 to direct the fluid away from the flywheel and against the housing section 11. The small amount of fluid remaining in the coupling is insufficient to transmit any appreciable torque.

Refilling of the coupling A is accomplished through a centrifugally operated valve 68 which has a spring loaded plunger 69 normally covering the outlet port 71 of the radial passage 59 in the driven shaft. When a predetermined rotational speed has been attained the plunger 69 moves outwardly, opening the port 71 and permitting fluid from the pump to enter the coupling A through the outlet port 71. It will be noted that with this modification a baffle plate 72 is provided upon the impeller 73 to form the sidewall of the fluid chamber formed by the coupling.

In operation this modification secures a higher starting torque since during starting the fluid coupling A is empty and the entire engine torque is transmitted through coupling B and is multiplied through the planetary gearset. As coupling A is filled with fluid it transmits an increasingly greater amount of the engine torque and the resultant torque multiplication of the transmission is accordingdy decreased until sufficient speed has been attained to cause the overrunning clutch 51 (Figure 1) to overrun the reaction member 53, at which time the entire torque is transmitted through coupling A in direct drive.

Figure 3:
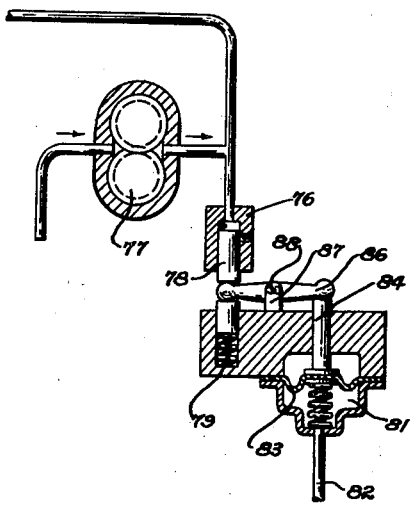
Figure 3 is a fragmentary semi-diagrammatical view of a portion of the control mechanism.

Figure 3 illustrates diagrammatically means for controlling the fluid pressure in the system in accordance with the load requirements. The pressure relief valve 76 limits the output pressure of the fluid pump 77. Movement of the plunger 78 of the relief valve is opposed by a spring 79 and the operation of the valve is modulated by a vacuum chamber 81 connected to the manifold of the vehicle engine through a conduit 82. The chamber includes a diaphragm 83 carrying a connecting rod 84 engageable with one end of a lever 86. The lever 86 is adjustably fulcrumed upon a bracket 87 by a pin and slot connection 88, and the opposite end of the lever is engageable with the plunger 78 of the valve. It will be seen that with this construction, when the load is light and the manifold vacuum relatively high, the oil pressure in the system will be greater. This greater oil pressure will cause the centrifugally controlled valve 68 to open sooner which will bring the coupling A into operation faster, thus decreasing the torque multiplication. On the other hand, under heavy load conditions when the manifold vacuum is low, the oil pressure in the system will be correspondingly low and opening of the valve 68 will be delayed, resulting in maintaining a greater torque multiplication to accommodate the greater load.

It will be understood that the invention is not to be limited to the exact construction shown and described, but that various changes and modifications may be made without departing from the spirit and scope of the invention, as defined in the appended claim.

What is claimed is:

In a power transmission unit, in combination, a housing, drive and driven members in said housing, a pair of annular impellers mounted concentric with said driven member and secured to each other back to back for rotation as a unit, means driving said impellers from said drive member, a pair of annular runners mounted concentric with said driven shaft and cooperating with said impellers to form separate fluid circuits, means for transmitting power from said runners to said driven member at different torque ratios, a fluid pump driven by said driven member, a conduit leading from the outlet of said fluid pump axially through said driven member, a passage establishing communication between said conduit and one of said fluid couplings to maintain the latter substantially filled with fluid under pressure, a supporting member forming a hub for the runner of the other of said fluid couplings, a radial passage in said supporting member communicating at its inner end with said conduit and at its outer end with a port opening into said last mentioned fluid coupling, a radially extending slidable plunger having a portion adapted to selectively cover and uncover said port, a spring normally urging said plunger radially inwardly to a position covering said port, said plunger being moved radially outwardly by centrifugal force against the action of said spring when a predetermined speed is reached by the runner of said last mentioned coupling to admit fluid from said conduit to said last mentioned coupling to progressively decrease the resultant torque multiplication of the transmission as said last mentioned coupling is filled with fluid, and an axially extending outlet passage leading from said second mentioned fluid coupling at a point so located as to drain a substantial portion of the fluid from said second mentioned coupling when the latter is idling or stationary.

ALBERT O. ROBERTS.

REFERENCES CITED

The following references are of record in the file of this patent:

UNITED STATES PATENTS

| Number | Name | Date |
|---|---|---|
| 2,015,300 | Dell et al. | Sept. 24, 1935 |
| 2,018,616 | Martyrer et al. | Oct. 22, 1935 |
| 2,077,580 | Patterson | Apr. 20, 1937 |
| 2,150,151 | Burrows et al | Mar. 14, 1939 |
| 2,203,177 | Patterson | June 4, 1940 |
| 2,324,733 | Smirl | July 20, 1943 |
| 2,341,624 | Kieser | Feb. 15, 1944 |
| 2,354,396 | Miller | July 25, 1944 |

FOREIGN PATENTS

| Number | Country | Date |
|---|---|---|
| 407,146 | Great Britain | Mar. 15, 1934 |
| 427,956 | Great Britain | May 2, 1935 |
| 365,474 | Italy | Dec. 5, 1938 |